(12) United States Patent
Salgo et al.

(10) Patent No.: US 7,282,654 B2
(45) Date of Patent: Oct. 16, 2007

(54) PATIENT WEIGHING SYSTEM

(76) Inventors: Peter Salgo, 184 E. 82$^{nd}$ St., New York, NY (US) 10028; Vern Liebmann, 1535 Sheridan Walk, NE., Atlanta, GA (US) 30324; Michael Sturdevant, 11351 Prouty Rd., Concord Township, OH (US) 44077

( * ) Notice: Subject to any disclaimer, the term of this patent is extended or adjusted under 35 U.S.C. 154(b) by 0 days.

(21) Appl. No.: 11/148,082

(22) Filed: Jun. 8, 2005

(65) Prior Publication Data

US 2006/0278443 A1 Dec. 14, 2006

(51) Int. Cl.
*G01G 5/00* (2006.01)

(52) U.S. Cl. ............... 177/144; 177/208; 177/254; 200/85 R

(58) Field of Classification Search ............... 177/144, 177/210 R, 208–209, 254; 200/85 A, 85 R
See application file for complete search history.

(56) References Cited

U.S. PATENT DOCUMENTS 4,007,734 A * 2/1977 Peters .................. 600/490
5,986,221 A * 11/1999 Stanley ................. 177/136
6,166,338 A * 12/2000 Ebato .................. 200/61.43
6,180,893 B1 * 1/2001 Salgo .................. 177/144
2004/0083550 A1 * 5/2004 Graebe, Jr.

* cited by examiner

*Primary Examiner*—Randy W. Gibson
(74) *Attorney, Agent, or Firm*—Goodwin Procter LLP

(57) ABSTRACT

Provided herein are exemplary embodiments of a weighing device comprising a bladder and a plurality of contact switches printed on the bladder. The bladder comprises a top and a bottom sheet of a suitable non porous material. The contact switches are made by printing a conductive pattern on one side of the bladder and printing conductive elements with leads or traces on the other side of the bladder. The two sides of the bladder are heat sealed together along the periphery of the bladder with the conductive portions facing each other. An inflation port is also formed in the periphery. In operation, the bladder is placed under an individual to be weighed. Next, the bladder is inflated using a gas. Finally, monitoring circuitry coupled to the bladder measures and records the pressure at the time each of the switches open due to the separation of the conductive portions.

15 Claims, 5 Drawing Sheets

PATIENT WEIGHING SYSTEM

CROSS-REFERENCE TO RELATED APPLICATIONS

Not applicable.

STATEMENT REGARDING FEDERALLY SPONSORED RESEARCH OR DEVELOPMENT

Not applicable

REFERENCE OF A "MICROFICHE APPENDIX"

Not applicable

BACKGROUND OF THE INVENTION

1. Field of Invention

The present invention relates, in general, to weighing devices.

2. Brief Description of the Prior Art

There are many medical conditions which may be treated more effectively than they are currently being treated today if the weight of a patient having such a condition could be easily and/or continuously monitored without the need to either get the patient out of bed or weigh the bed separately from the patient for weighing with the patient in combination at a later time.

The present weighing systems for bedridden patients in hospitals and/or long term care facilities include chairs and/or bulky slings coupled with scales in which a patient is moved from his/her bed for purposes of weighing. These systems are cumbersome and require a substantial amount of human intervention to operate. Many sick patients are too unstable to tolerate the amount of motion these systems require of them. Other present devices include a large scale upon which an empty bed is first weighed as a calibration followed by subsequent weighing of the patient/bed combination at a later time. A patient's weight is thus found by subtracting the initial bed weight from the combination total. Such a scale is expensive and therefore represents a limited resource. These devices may not be suitable if a patient's stay in a facility extends over a prolonged period of time.

One of the co-inventors of the present invention has patented in U.S. Pat. Nos. 6,180,893 and 6,396,004, an apparatus for weighing a patient while the patient remained in a bed including at least one flexible potentiometer mounted on top of a bed or mattress having a known compliance, i.e. known degree of flexure for a given weight, and connected to an electrical system for detecting and measuring the resistance of the potentiometer, so as to indicate the weight of the patient. The patents also disclose that one or more of the flexible potentiometers could be adhered to a sheet of plastic, such as Mylar, and placed upon the bed like a protective sheet for the bed.

Some examples of conditions where the weight of a patient is a significant indicator of the effectiveness of treatment include, but are not limited to, Congestive Heart Failure, Open Heart Surgery, Vascular Surgery, Sepsis and Extreme Diarrhea/Intestinal Upset. Said conditions often render a patient weak, debilitated and unable to stand without assistance, thus making it almost impossible to weigh him/her in the conventional manner (i.e., standing up on a scale).

A treatment for Congestive Heart Failure includes the elimination of retained excess fluid wherein body weight is a clear indication of success or failure of said treatment. The same can be said of Open Heart Surgery, which is often characterized by Congestive Heart Failure, wherein additional fluid is added to the body during surgery. Further, during Vascular Surgery, which may often be performed on Congestive Heart Failure patients, blood vessels leak resulting in excess body water which must be excreted by the kidneys. Sepsis, which is a condition wherein bacteria is found in the blood stream, also results in leakage of water from blood vessels into tissues necessitating treatment with additional fluid in order to maintain blood pressure. Lastly, the treatment of Extreme Diarrhea and Irritated Intestines often require massive amounts of fluid resuscitation to treat dehydration. For each of these conditions the patient's body weight is a marker for clinical progress or lack thereof. Indeed, all of these conditions require monitoring of the patient's body weight in order to regulate the treatment for the condition. Therefore, a simple and easy way to consistently and continuously weigh a patient throughout his/her treatment is necessary.

Thus, there is a need for a system that can monitor the weight of a patient in a hospital bed without the need to move the patient. There is a further need for such a system to be inexpensive and easy to operate. As further described herein, the system of the present invention comprises, in one embodiment, a printing process which is key to the system's overall low cost.

Systems have been suggested to automatically monitor the presence or absence of patients in hospital beds. It has been suggested that a bed position and activity sensing apparatus could be constructed by using an elongated sensor for placement parallel to one axis of the bed. The sensor includes first and second conductive members where the first conductive member has a resistance per unit length substantially different from that of the second conductor member. One of the conductive members is electrically coupled to a source of electrical power wherein the weight of the body in the bed urges the first and second conductive members together to define an electrical path for output of a sensor signal which varies in magnitude responsive to the position of the body along the sensor.

Such a system is shown in U.S. Pat. No. 5,353,012, which issued on Oct. 4, 1994 to Barham et al. and is entitled "Bed Position and Activity Sensing Apparatus". Other patents relating to this subject matter are U.S. Pat. No. 5,844,488 which issued Dec. 1, 1988 to Musick and is entitled "Bed Sensor and Alarm" and U.S. Pat. No. 4,565,910 which issued Jan. 21, 1986 to Mersick et al. and is entitled "Switch Apparatus Responsive to Distortion". These systems, while having an electrical device mounted in a patient's bed or adhered to a patient's sheet, are used for sensing the whereabouts of the patient and are not used for weighing the patient.

SUMMARY OF THE INVENTION

The present invention addresses the aforementioned limitations of the prior art by providing, in accordance with one aspect of the present invention, a weighing system, comprising: an inflatable component, such as a bladder, having a first side and a second side, for supporting a patient to be weighed. The first side of the inflatable component includes a plurality of first conductive elements thereon for forming a plurality of first poles of a plurality of switches. The second side of the inflatable component includes a plurality of second conductive elements thereon for forming a plurality of second poles of the plurality of switches. An inflation port is formed in the inflatable component through which a gas is introduced into the inflatable component thereby opening said plurality of switches to enable the weighing of the patient.

In accordance with a second aspect, the system further includes a monitoring device coupled to the inflatable component to measure and record pressure of the gas at a time when said at least some of said plurality of switches open to enable the weighing of the patient.

In accordance with a third aspect, the monitoring device is a computer.

In accordance with a fourth aspect, the inflatable component comprises a non porous material suitable for having a conductive material affixed thereto.

In accordance with a fifth aspect, the non porous material can be polymeric, such as polycarbonate film or polyethylene coated paper.

In accordance with a sixth aspect, the inflatable component comprises a non porous and printable material, such as paper, cardboard, cloth, etc.

In accordance with a seventh aspect, the inflatable component comprises conductive foil, e.g., aluminum or other suitable metallic foil, on one side (ground plane).

These and other aspects, features and advantages of the present invention will become better understood with regard to the following description, appended claims, and accompanying drawings.

BRIEF DESCRIPTION OF THE DRAWINGS

Embodiments of the present invention will now be briefly described with reference to the following drawing(s) in which.

DESCRIPTION OF THE INVENTION

The aspects, features and advantages of the present invention will become better understood with regard to the following description with reference to the accompanying drawing(s). What follows are preferred embodiments of the present invention. It should be apparent to those skilled in the art that these embodiments are illustrative only and not limiting, having been presented by way of example only. All the features disclosed in this description may be replaced by alternative features serving the same purpose, and equivalents or similar purpose, unless expressly stated otherwise. Therefore, numerous other embodiments of the modifications thereof are contemplated as falling within the scope of the present invention as defined herein and equivalents thereto.

FIGS. 1–3

Figure 1:
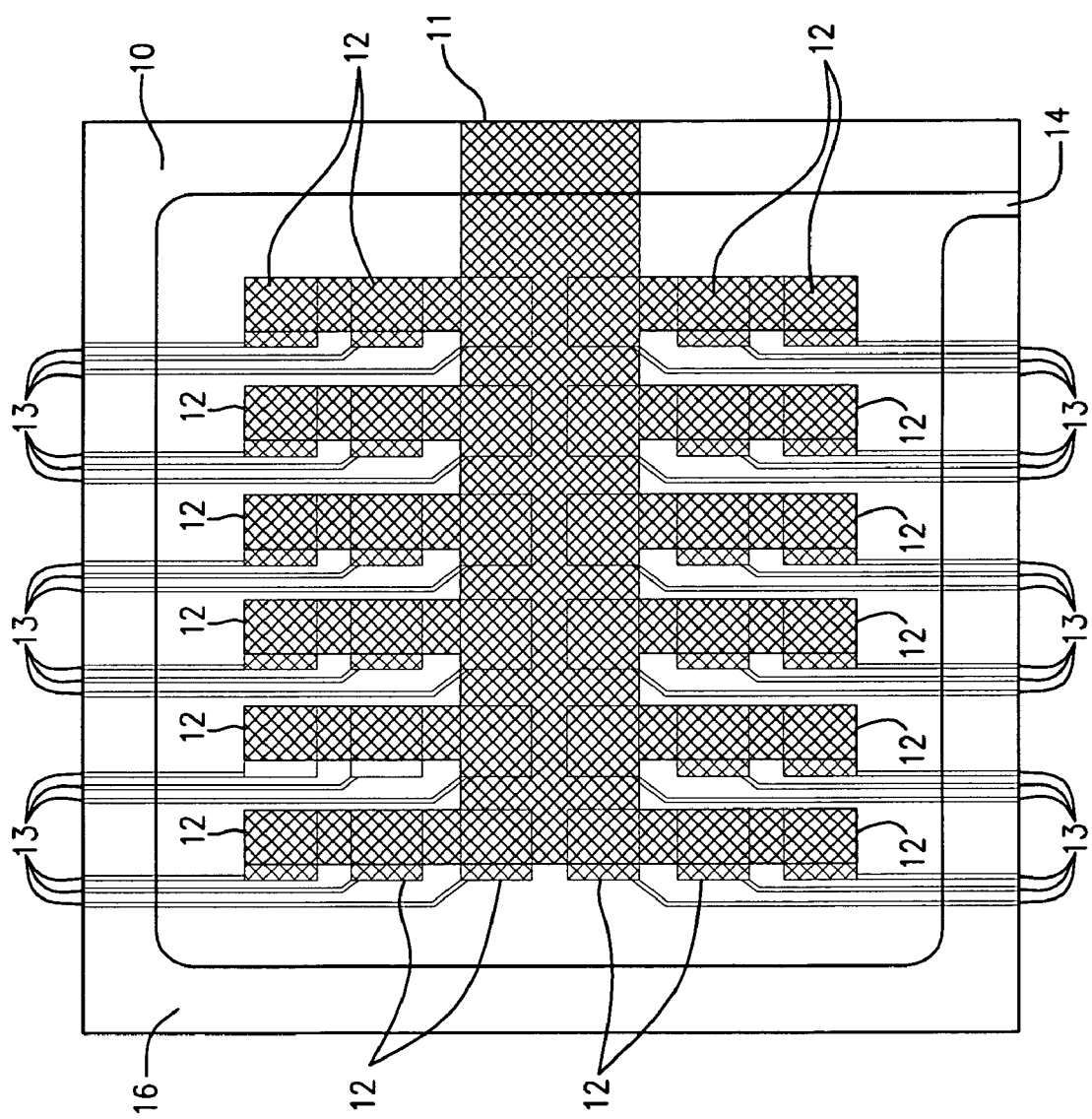
FIG. 1 depicts an exemplary embodiment of a patient weighing system comprising an inflatable device in accordance with the teachings presented herein.
Figure 2:
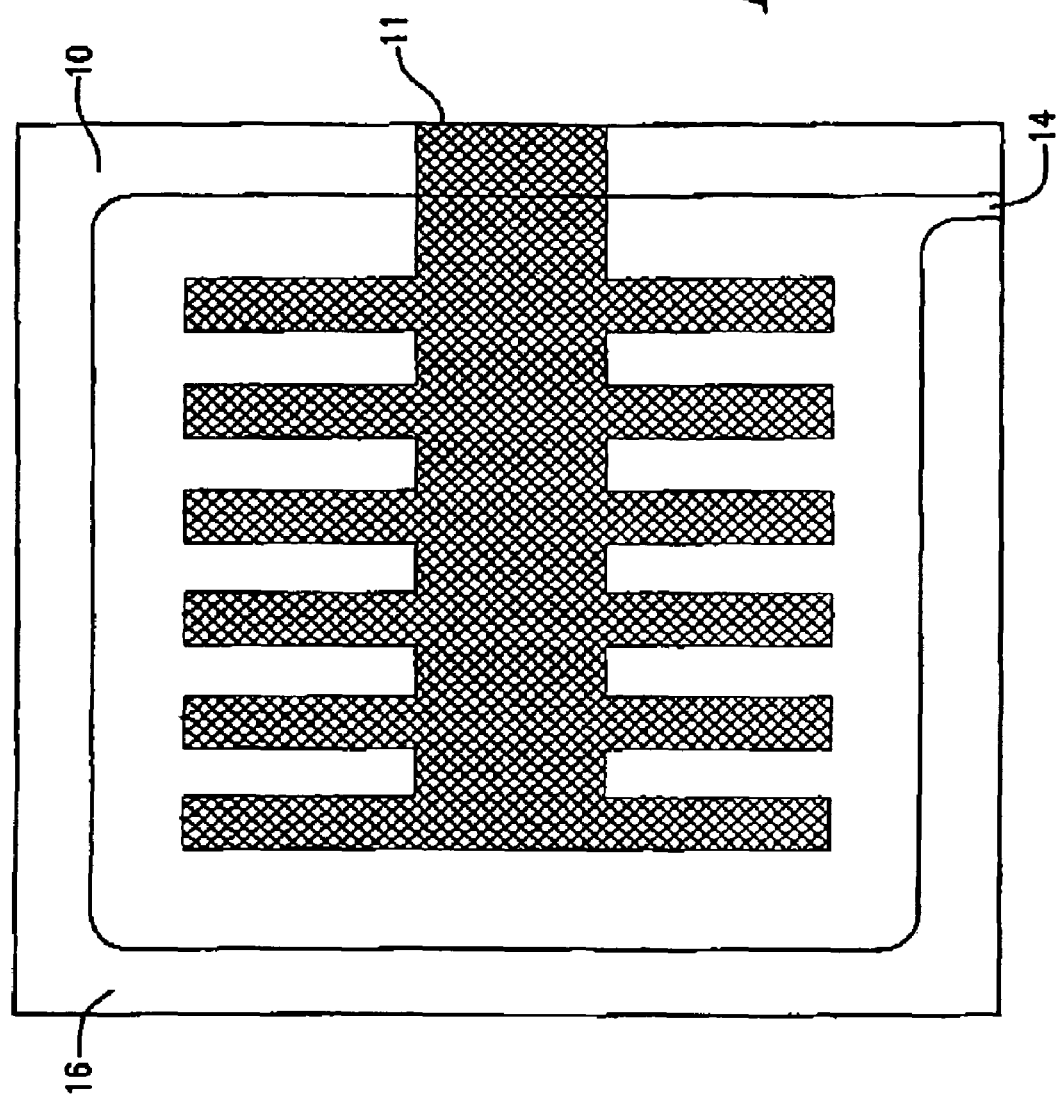
FIG. 2 depicts one side of the system of FIG. 1 in accordance with the teachings presented herein
Figure 3:
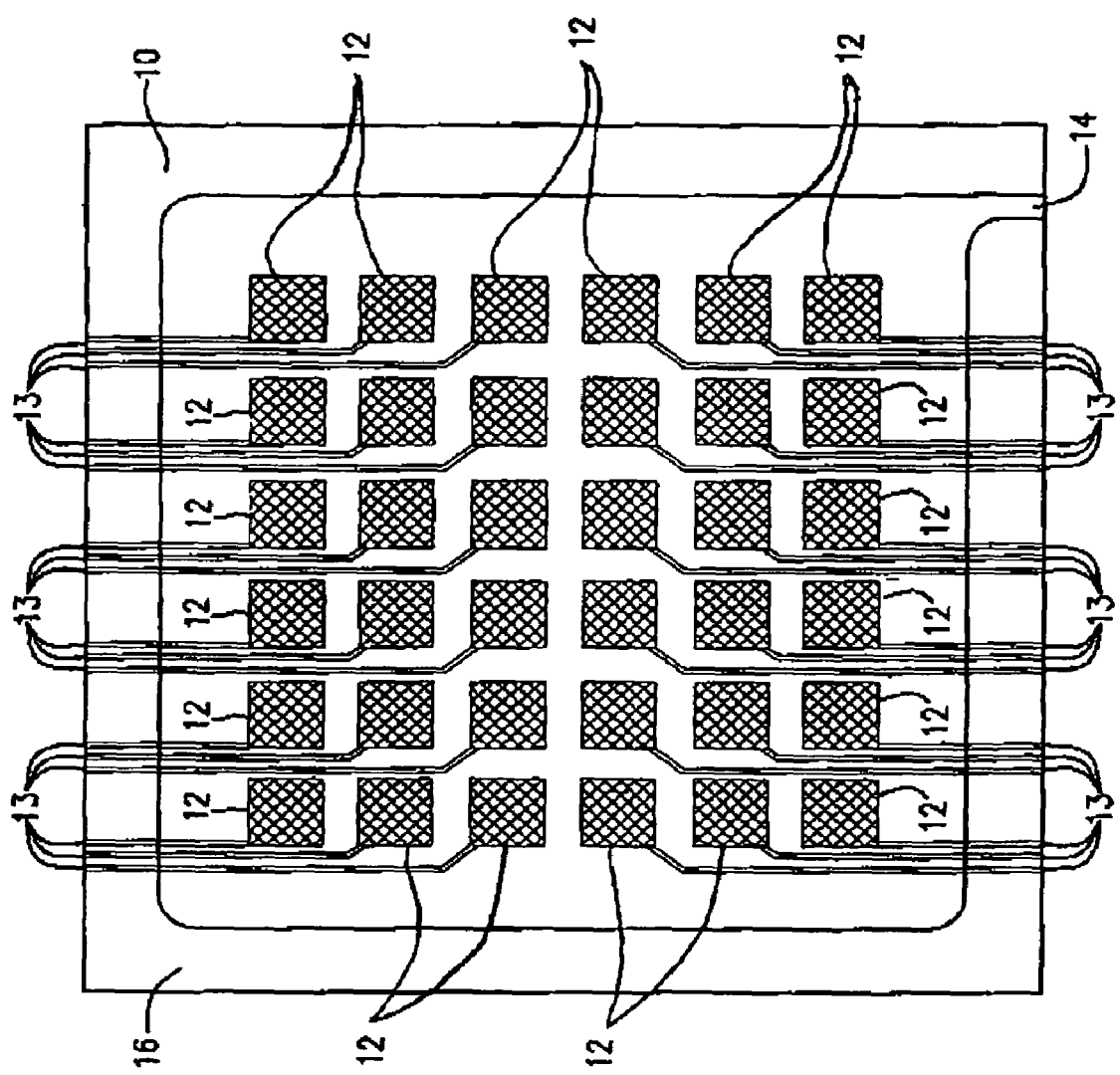
FIG. 3 depicts a second side of the system of FIG. 1 in accordance with the teachings presented herein.

As shown in FIGS. 1–3, the present invention embodies a technique which combines printed contact switches and the measurement of pressure inside a closed bladder 10. The bladder 10 is an inflatable device made from a pair of sheets.

In one embodiment, the sheets are made from polycarbonate film. The sheets can be made from any nonporous material on which conductive material can be printed. The sheets have a matrix of switches (e.g., a 6×6 matrix) printed thereon. The switches are made by printing a conductive pattern 11 on one side of the bladder as shown in FIG. 2 and, as shown in FIG. 3, printing a plurality of conductive shapes 12 (e.g., 36 squares) with leads 13 to the edge of the sheet on the other side of the bladder. The two sides are sealed together along the periphery 16 thereof with the conductive portions facing each other. An inflation port 14 is also formed in the periphery. The conductive shapes 12 on one side and the conductive pattern 11 (which operates as a ground plane) on the other side form a multiplicity of switch contacts which are closed when pressed together.

FIG. 4

Figure 4:
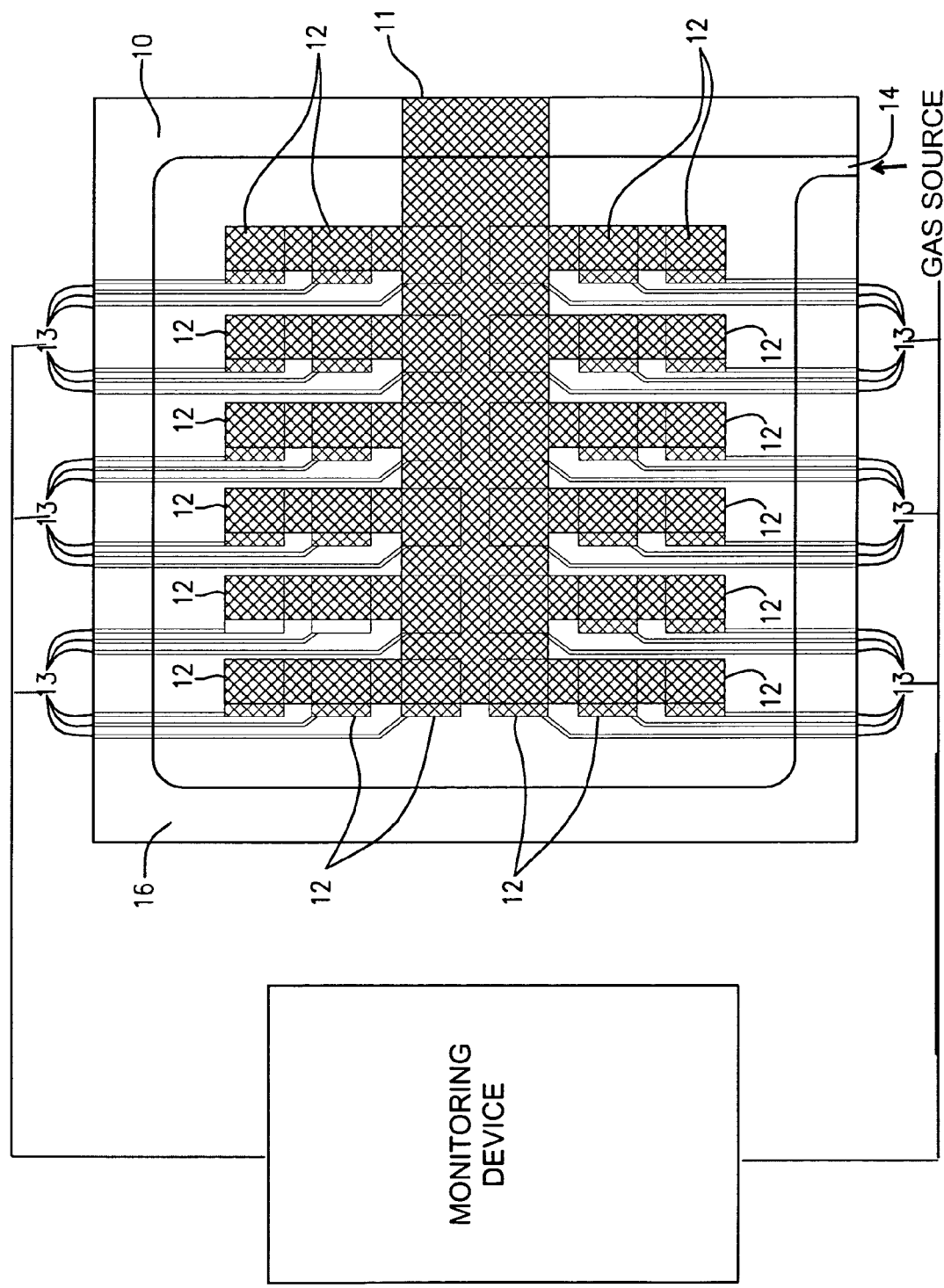
FIG. 4 depicts another view of the system of FIG. 1 in accordance with the teachings presented herein.

Referring to FIG. 4, In operation, the bladder 10 is placed on a bed. A patient is next placed on the bed on top of the bladder 10. When the patient is to be weighed a source of gas is used to inflate the bladder 10. As the bladder 10 inflates, a monitoring circuitry or device measures and records the pressure at the time each of the plurality of switches open due to the separation of each conductive shape 12 from the conductive pattern 11. Because each shape 12 is the same size, one can, as an approximation, assume that the same ratio of force to pressure can be used to calculate the force needed to open that switch. A sum of all the forces necessary to open the switches would then be the weight of the patient. It has been found however, that due to edge effects, there is a need to modify the ratio from switch to switch. A table can be used in a computer system to ascribe an exact ratio for each switch. Such exact ratios can easily be measured as a calibration for a particular bladder switch configuration.

FIG. 5

Figure 5:
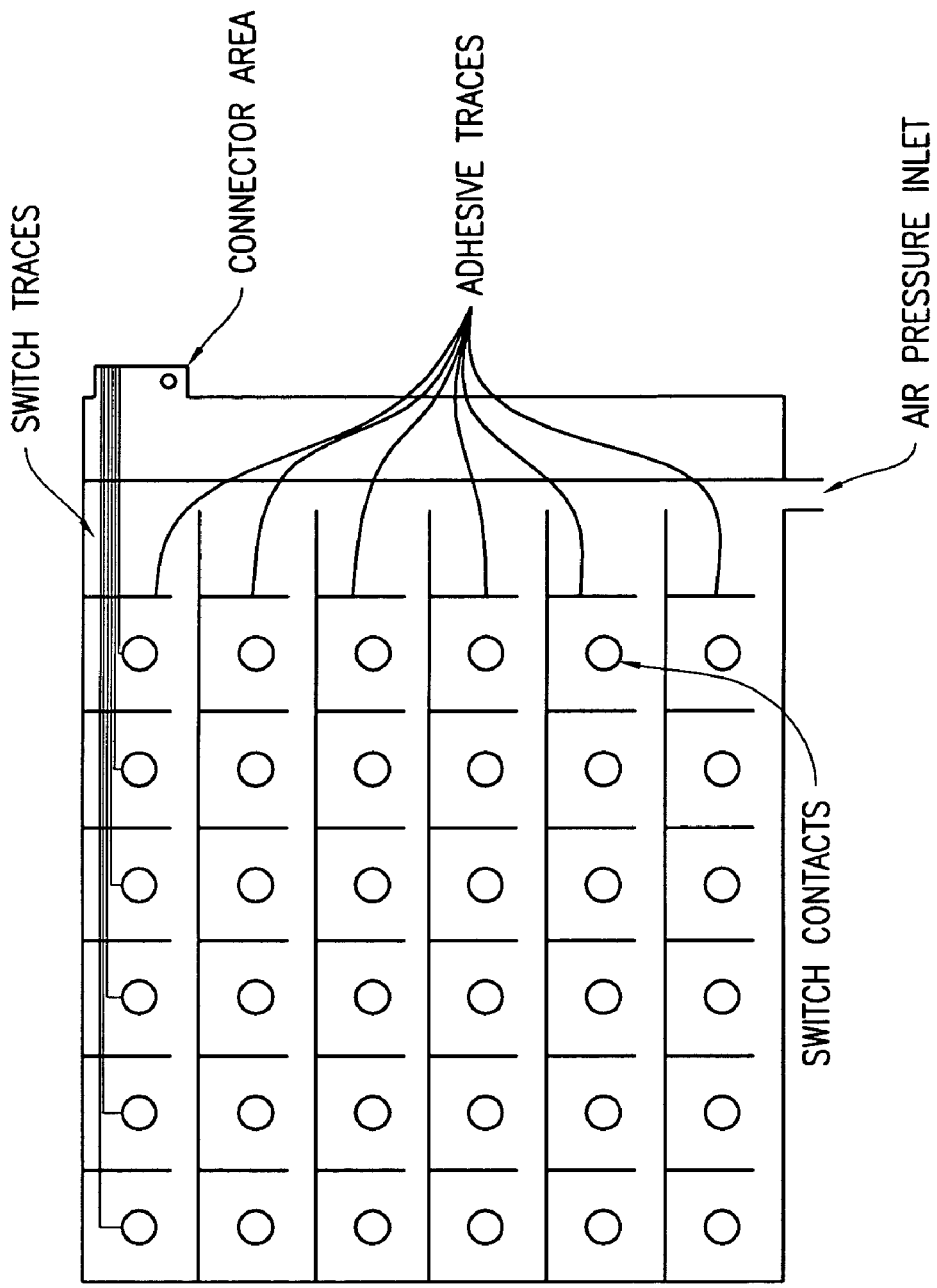
FIG. 5 depicts an alternate embodiment of the patient weighing system in accordance with the teachings presented herein

FIG. 5 depicts another embodiment in which the bladder 10 sheets are polyethylene coated paper printed with conductive ink. In this embodiment adhesive traces are placed on the sheet which has the squares (in this case circles) printed on it. The adhesive traces mechanically isolate each switch 12 so that the ratio of force to pressure to open each switch is substantially the same.

Having now described preferred embodiments of the invention, it should be apparent to those skilled in the art that the foregoing is illustrative only and not limiting, having been presented by way of example only. All the features disclosed in this specification (including any accompanying claims, abstract, and drawings) may be replaced by alternative features serving the same purpose, and equivalents or similar purpose, unless expressly stated otherwise. For example, the present invention contemplates various sizes and shapes of the bladder, and is not limited by the number of switches used and the described and depicted pattern of switches. Therefore, numerous other embodiments of the modifications thereof are contemplated as falling within the scope of the present invention as defined by the appended claims and equivalents thereto.

What is claimed is:

1. A weighing system, comprising:
   an inflatable component comprising a first side and a second side, for supporting a patient to be weighed;
   said first side having a plurality of first conductive elements thereon for forming a plurality of first poles for a plurality of switches;
   said second side having a plurality of second conductive elements thereon for forming a plurality of second poles for said plurality of switches; and;

an inflation port formed in said inflatable component through which a gas is introduced into said inflatable component thereby opening at least some of said plurality of switches to enable the weighing of said patient.

2. The system as in claim 1, further comprising a measurement device coupled to said inflatable component to measure and record pressure of said gas at a time when each of said plurality of switches open.

3. The system as in claim 2, wherein said measurement device is a computer.

4. The system as in claim 1, wherein said inflatable component is a bladder.

5. The system as in claim 1, wherein said inflatable component comprises a non porous material suitable for having a conductive material affixed thereto.

6. The system as in claim 5, wherein said non porous material comprises polycarbonate film.

7. The system as in claim 5, wherein said non porous material comprises polyethylene coated paper.

8. The system as in claim 1, wherein said gas is air.

9. A weighing apparatus, comprising:
an inflatable component comprising a first side and a second side, for supporting a patient to be weighed;
said first side having a plurality of first conductive elements thereon for forming a plurality of first poles for a plurality of switches;
said second side having a plurality of second conductive elements thereon for forming a plurality of second poles for said plurality of switches;
an inflation port formed in said inflatable component through which a gas is introduced into said inflatable component thereby opening at least some of said plurality of switches; and
a measurement device coupled to said inflatable component to measure and record pressure of said gas at a time when each of said plurality of switches open to enable the weighing of said patient.

10. The system as in claim 9, wherein said measurement device is a computer.

11. The system as in claim 9, wherein said inflatable component is a bladder.

12. The system as in claim 9, wherein said inflatable component comprises a non porous material suitable for having a conductive material affixed thereto.

13. The system as in claim 12, wherein said non porous material comprises polycarbonate film.

14. The system as in claim 12, wherein said non porous material comprises polyethylene coated paper.

15. The system as in claim 9, wherein said gas is air.

* * * * *